(12) United States Patent
Maria

(10) Patent No.: US 9,692,726 B2
(45) Date of Patent: *Jun. 27, 2017

(54) FRONT END PROCESSOR FOR SHORT MESSAGE SERVICE CENTERS

(71) Applicant: AT&T Mobility II LLC, Atlanta, GA (US)

(72) Inventor: Arturo Maria, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/993,475

(22) Filed: Jan. 12, 2016

(65) Prior Publication Data
US 2016/0127314 A1 May 5, 2016

Related U.S. Application Data

(63) Continuation of application No. 14/075,153, filed on Nov. 8, 2013, now Pat. No. 9,264,453.

(51) Int. Cl.
*H04L 1/00* (2006.01)
*H04L 29/06* (2006.01)
*H04W 4/14* (2009.01)

(52) U.S. Cl.
CPC ...... *H04L 63/0209* (2013.01); *H04L 63/1441* (2013.01); *H04L 65/102* (2013.01); *H04L 65/1006* (2013.01); *H04L 69/08* (2013.01); *H04W 4/14* (2013.01)

(58) Field of Classification Search
CPC ...... G06Q 10/10; G06Q 10/107; H04L 29/06; H04L 29/08072; H04L 29/06027; H04L 12/581; H04L 12/585

USPC .................. 370/466, 465, 467; 709/204–207
See application file for complete search history.

(56) References Cited

U.S. PATENT DOCUMENTS

| | | | |
|---|---|---|---|
| 7,027,825 B2 | 4/2006 | Mizell et al. |
| 7,133,420 B2 | 11/2006 | Chang et al. |
| 7,149,537 B1 | 12/2006 | Kupsh et al. |
| 7,319,857 B2 | 1/2008 | Baldwin et al. |
| 7,701,969 B2 | 4/2010 | Carrigan et al. |
| 7,949,773 B2 | 5/2011 | Smith |
| 8,190,687 B1 | 5/2012 | Chen et al. |
| 8,229,091 B2 | 7/2012 | Romeo |
| 8,526,981 B2 | 9/2013 | Shaheen |
| 2007/0093243 A1 | 4/2007 | Kapadekar et al. |
| 2008/0004051 A1 | 1/2008 | Sylvain |
| 2008/0102816 A1 | 5/2008 | Shan et al. |

(Continued)

FOREIGN PATENT DOCUMENTS

| | | |
|---|---|---|
| CN | 1980411 | 6/2007 |
| WO | 9741654 | 11/1997 |

(Continued)

*Primary Examiner* — Dady Chery
(74) *Attorney, Agent, or Firm* — Chiesa Shahinian & Giantomasi PC

(57) ABSTRACT

A communication gateway which includes a short-message-system network element is disclosed. The communication gateway includes a short-message-system network element to transmit short-message data to a plurality of session-initiation-protocol endpoints and a front-end processor coupled with the short-message-system network element to provide session-initiation-protocol services for translating the short-message data transmitted between the plurality of session-initiation-protocol endpoints.

20 Claims, 1 Drawing Sheet

(56) References Cited

U.S. PATENT DOCUMENTS

| | | |
|---|---|---|
| 2010/0075700 A1 | 3/2010 | Casto et al. |
| 2012/0020293 A1 | 1/2012 | Nix, Jr. et al. |
| 2012/0134278 A1 | 5/2012 | Li |
| 2013/0210470 A1 | 8/2013 | Davies et al. |

FOREIGN PATENT DOCUMENTS

| | | |
|---|---|---|
| WO | 9949680 | 9/1999 |
| WO | 03033653 A2 | 1/2003 |
| WO | 2005032165 A1 | 4/2005 |
| WO | 2010113201 A2 | 10/2010 |

FRONT END PROCESSOR FOR SHORT MESSAGE SERVICE CENTERS

This application is a continuation of U.S. patent application Ser. No. 14/075,153 filed Nov. 8, 2013, the disclosure of which is herein incorporated by reference in its entirety.

BACKGROUND

The present disclosure relates generally to a system for messaging content delivery, and more specifically to a system for managing the delivery of short messages using an enhanced communication gateway.

Short message service (SMS), first launched in 1991, also known as text messaging, refers to a protocol for sending and receiving short messages (SMS can also refer to the messages themselves) between mobile devices. SMS is among the many technological contributions included in the Global System for Mobile Communications (GSM). SMS initially enabled bidirectional transmission of short alpha-numeric text messages to and from mobile phones and personal data assistants (PDA). Currently almost every mobile phone or PDA includes SMS as a standard feature and, as a result, messaging via SMS is widely used by the users of such devices. An advantage of SMS is that SMS messages can be quickly composed and sent to a desired recipient.

A typical SMS network includes a short message service center (SMSC), SMS gateways, PSTN gateways, and SIP gateways. The SMSC generally operates in a store-and-forward manner, to guarantee delivery of text messages to a Short Message Entity (SME), e.g., a cellular telephone handset, a phone, or a computer-based communication system. The SMSC typically includes a storage subsystem to store messages that are temporarily incapable of being transmitted to a destination device, e.g., when the destination device is inactive or outside of the service area of the SMS network. The SMSC continues its attempts to forward undelivered messages to an appropriate destination address in intervals, until the designated device has become available, e.g., is turned on or has moved into the service area of the SMS network, and message receipt is confirmed. The SMSC generally interacts with various interfaces to enable the receipt of short messages originating from a multitude of platforms supported by various providers which utilize their proprietary protocols.

The SMS gateways provide the network interface between IP networks, SMS requesters, External SME service entities (ESME) and SS7 signaling networks. The SMS gateways are also capable of communicating with external Session Initiation Protocol (SIP) gateways in order to send/transmit/receive messages to and from SIP enabled devices. SIP is an Internet Engineering Task Force (IETF) standard signaling protocol for teleconferencing, telephony, presence and event notification and instant messaging. It provides a mechanism for setting up and managing connections, but not for transporting the audio or video data. It is arguably the most widely used protocol for managing Internet telephony. A SIP-based VoIP implementation may send the encoded voice data over the network in a number of ways.

In the event an SMS gateway receives a message from an ESME and desires to transmit this message to a SIP enabled device, it sends the message to a SIP/SMS gateway which in turn performs protocol translation, establishes a SIP session with the end-point (e.g. device or network element) and then sends the message. The challenge with using this approach is that SMSC must interface with external SIP gateways in order to reach SIP-enabled devices. Although this does not seem like a significant problem as long as the protocol translation is properly performed, the carriers are left at the mercy of external SIP gateway providers if the SIP enabled device is out of the control of the carrier or out of the reach of the carrier core network. Another challenge with this approach is potential performance degradation as the message is transmitted from the SMSC to an external gateway for delivery. Yet another challenge with traversing SIP enabled gateways is that this architecture potentially dis-intermediates the carrier from end-point SIP enabled subscribers limiting the monetization aspects of SMS message delivery.

BRIEF SUMMARY

In one embodiment, a communication gateway includes a short-message-system network element to transmit short-message data to a plurality of session-initiation-protocol endpoints and a front-end processor coupled with the short-message-system network element to provide session-initiation-protocol services for translating the short-message data transmitted between the plurality of session-initiation-protocol (SIP) enabled endpoints. In an embodiment, SIP enabled endpoints are mobile handheld devices such as cellular phones, personal digital assistants, laptops, portable tablets, and the like.

In one other embodiment, a system includes a plurality of front-end processors, each of the plurality of front-end processors coupled with the short-message-system network element, a master front-end processor coupled to each of the plurality of front-end processors to provide management services and provisioning services to each of the plurality of front-end processors, where the short-message-system network element is to transmit short-message data to a plurality of session-initiation-protocol endpoints and to provide session-initiation-protocol services to translate short-message data transmitted between the plurality of session-initiation-protocol endpoints.

DETAILED DESCRIPTION

Figure 1:
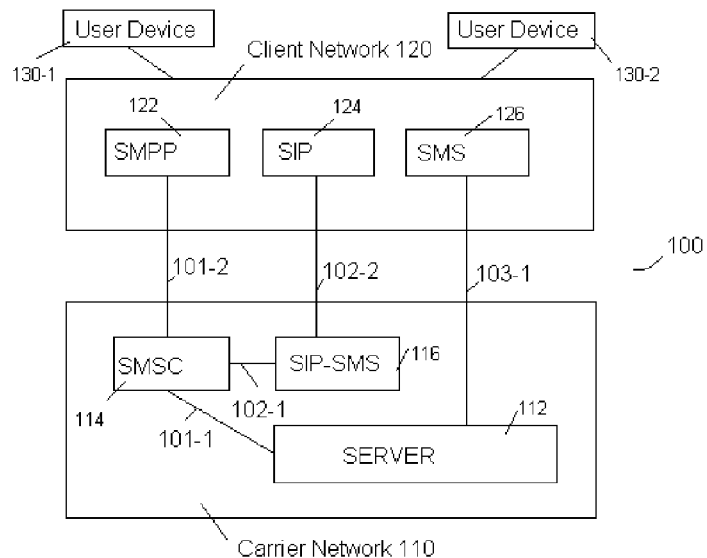
FIG. 1 illustrates an exemplary existing communication network.

FIG. 1 illustrates an exemplary existing communication network 100 which includes a carrier network 110 communicatively coupled with a client network 120. The carrier network 110 generally includes a server 112 communicatively coupled with SMSC 114 which is communicatively coupled with a gateway to process SIP-enabled short messages (i.e., SIP-SMS 116). The client network 120 includes a plurality of gateways, such as a Short Message Peer-to-Peer (SMPP) 122, SIP 124, or SMS 126. It is to be understood that the client network 120 can include a Plain Old Telephone Service (POTS) network, a Public Switched Telephone Network (PSTN) network, a Short Messaging System (SMS) network, a Specialized Applications, and the like.

As noted above, the challenge with using the existing communication network 100 is that SIP-SMS 116 must interface with an external gateway while dealing with a plurality of corresponding interfaces translating transmitted data in order to reach user device 130-1 and user device 130-2. Depending on a type and configuration of a client network, carriers using the communication network 100 are forced to implement complex algorithms to ensure delivery of SMS messages to SIP-enabled devices. In other words, the carriers using the communication network 100 are left at the mercy of external SIP gateway providers if the SIP enabled device is out of the control of the carrier or out of the reach of a carrier network.

For example, in order to communicate an SMS message to an SMPP network, via SMPP 122, the SMS message has to be transmitted from the server 112 to the SMSC 114 via communication link 101-1. The SMSC 114 propagates the SMS message to the SMPP 122 via communication link 101-2. In order to communicate an SMS message to SIP-enabled user devices (not shown), via SIP 124, the SMS message has to be transmitted from the server 112 to the SIP-SMS 116, via communication link 101-1 to the SMSC 114 and then to SIP-SMS 116 via communication link 102-1. The SIP-SMS 116 then propagates the SMS message to the SIP 124 via communication link 102-2. In order to communicate an SMS message to the SMS network, via SMS 126, the SMS message is transmitted from the server 112 to the SMS 126 via communication link 103-1. It is to be noted that client network 120 is presented for illustrative purposes and that a number, a type, and configuration of client network 120 may vary.

There are a number of solutions in the industry today that provide interfaces between SMSC and SIP enabled network elements and SIP enabled endpoints. These solutions are typically implemented in the form of SIP gateways which are standalone network elements that provide translation between SMS protocols such as SMPP and SIP clients and servers. In order to improve the efficiency and effectiveness of SMSC and SIP enabled clients and network elements, the present disclosure proposes integrating a Front End Processor (FEP) with the SMSC.

Figure 2:
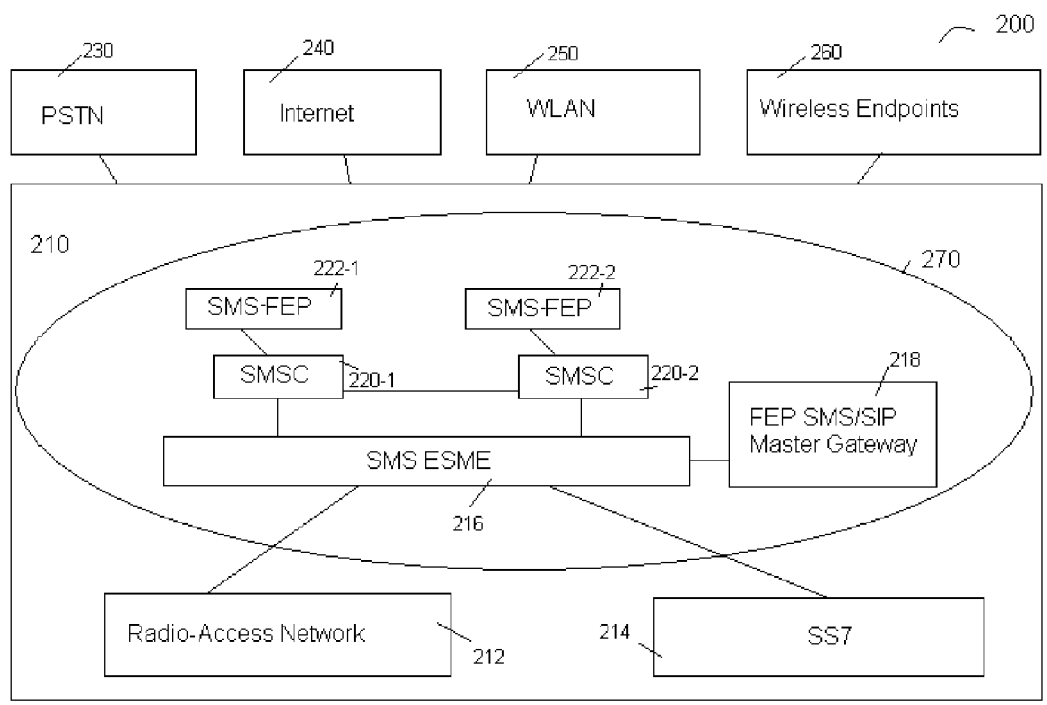
FIG. 2 illustrates an exemplary communication network which includes a communication gateway in accordance with an embodiment.

FIG. 2 illustrates an exemplary communication network 200. In an embodiment, the exemplary communication network 200 includes a carrier network 210 communicatively coupled with a plurality of external gateways for respective external networks. The exemplary carrier network 210 includes a Short Messaging System External Short Messaging Entity (SMS ESME) 216, FEP SMS/SIP Master Gateway 218 which is communicatively connected to SMSC 220-1 and SMSC 220-2, where each of SMSC 220-1 and SMSC 220-2 are communicatively coupled with a corresponding Short Messaging System Front-End Processor (SMS-FEP) 222-1 and SMS-FEP 222-2 to transmit short-message data to SIP enabled endpoints, where the short-message data is 160 seven-bit character-long messages.

The carrier network 210 may further include an Internet Protocol/Multi-Protocol Label Switching (IP/MPLS) Converged Network 270. The fundamental concept behind MPLS technique is that of labeling packets. In a traditional routed IP network, each router makes an independent forwarding decision for each packet based solely on the packet's network-layer header. Thus, every time a packet arrives at a router, the router has to "think through" where to send the packet next. With MPLS, the first time the packet enters a network, it's assigned to a specific forwarding equivalence class (FEC), indicated by appending a short bit sequence (the label) to the packet. Each router in the network has a table indicating how to handle packets of a specific FEC type, so once the packet has entered the network, routers don't need to perform header analysis. Instead, subsequent routers use the label as an index into a table that provides them with a new FEC for that packet.

In an embodiment, SMSC 220-1 and SMSC 220-2 are communicatively connected to SMS ESME 216. Also, SMSC 220-1 and SMSC 220-2 are interconnected to each other. The relation between SMS ESME 216 and each of SMSC 220-1 and SMSC 220-2 is a master-slave relation because SMSC 220-1 and SMSC 220-2 are providing services to SMS ESME 216, and SMS ESME 216 uses these services from SMSC 220-1 and SMSC 220-2. The SMS ESME 216, via IP/MPLS Converged Network 270, is also a connecting point for a plurality of external gateways, such as PSTN 230, Internet 240, WLAN 250, and Wireless Endpoints 260. PSTN 230 is generally accessed when transmitted SIP-enabled SMS messages need to be translated and stored as voice messages. Internet 240 is generally accessed when SIP-enabled SMS messages are propagated via web servers. WLAN 250 is generally accessed when SIP-enabled SMS messages are propagated with third-party edge access networking equipment (e.g., Aruba Networks). Wireless Endpoints 260 is generally accessed when SIP-enabled SMS messages are propagated to the end-user SIP-enabled wireless devices, such as cellular phones, laptops, personal digital assistants, tablets, and the like. It is to be understood that the provided list of external gateways connecting to the carrier network 210 is not limited to the listed external gateways.

One of the functions of the SMSC 220-1 and SMSC 220-2 is to store and forward the SIP-enabled SMS messages while the SMS ESME 216 does not have this function. When an SMS message is sent by an SMS ESME 216 to any of SMSC 220-1 and SMSC 220-2 towards its destination, this SMS message may be stored in a queue of SMSC 220-1 and SMSC 220-2 until the destination of the message becomes available. During this time the SMS ESME 216 has the option to cancel the message in queue, to replace it, or to check its status. SMS ESME 216 can also send a message to multiple destinations which will be handled by SMSC 220-1 and SMSC 220-2.

In an embodiment, each of SMS-FEP 222-1 and SMS-FEP 222-2 interfaces, through SMS ESME 216, with the FEP SMS/SIP Master Gateway 218 which provides management and provisioning services to each SMS-FEP 222-1 and SMS-FEP 222-2. In an embodiment, the management and provisioning services include instructions to SMS-FEP 222-1 and SMS-FEP 222-2 on message routing between the components within the communication network 200. For example, for communication of data between the carrier network 210 and WLAN gateway 250, the FEP SMS/SIP Master Gateway 218 may instruct the SMSC 220-1 and SMSC 220-2 that data will be propagated by the FEP SMS/SIP Master Gateway 218 directly bypassing the SMSC 220-1 and SMSC 220-2.

In another embodiment, the FEP SMS/SIP Master Gateway 218 stores a master catalog or repository of subscriber profiles, ESME profiles, and other parameters to provision and control the each of the plurality of SMS-FEP 220-1 and SMS-FEP 222-2. In yet another embodiment, the FEP SMS/SIP Master Gateway 218 coordinates responses to security threats and malicious actions by sending commands to the each of the plurality of SMS-FEP 222-1 and SMS-FEP 222-2 and updating their respective firewall tables and other parameters. These commands also enable the each of the plurality of SMS-FEP 222-1 and SMS-FEP 222-2 to share security information, threats and communicate with each other.

Depending on the network configuration parameters, in one embodiment each of SMS-FEP 222-1 and SMS-FEP 222-2 has a limited network presence while, in an alternative embodiment, the each of SMS-FEP 222-1 and SMS-FEP 222-2 has no network presence. In an embodiment, each SMS-FEP 222-1 and SMS-FEP 222-2 is coupled with the corresponding SMSC 220-2 and SMSC 220-2, respectively, and provides SIP enablement and protocol translation services. Each of the SMS-FEP 222-1 and SMS-FEP 222-2 communicates with a FEP SMS/SIP Master Gateway 218 for provisioning, performance parameters and security purposes.

In an embodiment, SMS EMSE 216 allows for connection of Radio-Access Network (RAN) to support SMS communication between modern radio-based communication devices featuring radio-based technology, such Bluetooth, Wi-Fi, 3G, 4G, or LTE technology. SMS EMSE 216 also allows for connection between communication devices via Signaling System No. 7 (SS7) 214 which represents a set of telephony signaling protocols which are used to set up most of the world's public switched telephone network telephone calls.

In one embodiment, each of the SMS-FEP 222-1 and SMS-FEP 222-2 is implemented as an attached processor, blade or other connected device to the SMSC 222-1 and SMSC 220-2 to provide a single network presence for this element.

In another embodiment, each of the SMS-FEP 222-1 and SMS-FEP 222-2 provides SIP protocol translation services as an attached front end processor. In this context, each of the SMS-FEP 222-1 and SMS-FEP 222-2 is responsible for translating Short Message Peer-to-Peer (SMPP) messages to SIP-enabled messages targeted and destined to the SIP endpoint.

In another embodiment, each of the SMS-FEP 222-1 and SMS-FEP 222-2 interfaces with Public Service Agencies for emergency communications and provides the required protocol translation and message delivery services.

Yet in another embodiment each of the SMS-FEP 222-1 and SMS-FEP 222-2 acts as a layer 2 stateful firewall screening incoming message traffic from SIP end-point devices and performing security services.

There are several advantages associated with implementing the SMS-FEP 222-1 and SMS-FEP 222-2 being coupled with SMSC 220-1 and SMSC 220-2, respectively, to perform SIP protocol conversion services. The SMS-FEP 222-1 and SMS-FEP 222-2 improve the performance of the corresponding SMSC 220-1 and SMSC 220-2 since SIP-enablement occurs within a single network element as opposed to traversing the carrier network or external network for these services. Another advantage of disclosed embodiments is that carriers could not be potentially dis-intermediated from the customer because SIP enablement would take place within the SMSC and the carrier network.

Another advantage associated with embodiments disclosed in the present disclosure is the ability to coordinate SIP enablement among the SMS-FEP 222-1 and SMS-FEP 222-2. In other words, since each of the SMS-FEP 222-1 and SMS-FEP 222-2 would communicate with a common gateway, their actions could be coordinated particularly in response to a security threat, virus or other malicious activity.

The foregoing Detailed Description is to be understood as being in every respect illustrative and exemplary, but not restrictive, and the scope of the disclosure presented herein is not to be determined from the Detailed Description, but rather from the claims as interpreted according to the full breadth permitted by the patent laws. It is to be understood that the embodiments shown and described herein are only illustrative of the principles of the present disclosure and that various modifications may be implemented by those skilled in the art without departing from the scope and spirit of the disclosure. Those skilled in the art could implement various other feature combinations without departing from the scope and spirit of the disclosure.

The invention claimed is:

1. A communication gateway comprising:
   a front-end processor communicatively coupled to a short-message-system network element, the front-end processor providing session-initiation-protocol services for translating short-message data transmitted between a plurality of session-initiation-protocol endpoints, the front-end processor storing a firewall table; and
   a master gateway communicatively coupled to the front-end processor and storing a plurality of external short-message entity profiles,
   wherein the front-end processor manages the firewall table using the plurality of external short-message entity profiles.

2. The communication gateway of claim 1, wherein the front-end processor manages the firewall table to coordinate a response of the front-end processor to a security threat.

3. The communication gateway of claim 2, wherein the front-end processor executes a layer 2 firewall using the firewall table, the layer 2 firewall screening messages received from the plurality of session-initiation-protocol endpoints.

4. The communication gateway of claim 3, wherein the security threat is detected by the front-end processor.

5. The communication gateway of claim 4, wherein data pertaining to the security threat is shared with other front-end processors communicatively coupled to the master gateway.

6. The communication gateway of claim 1, wherein the short-message-system network element transmits short-message data to the plurality of session-initiation-protocol endpoints.

7. The communication gateway of claim 1, wherein the session-initiation-protocol services for translating short-message data comprises communicating with a plurality of Public Service Agencies for session-initiation-protocol translation and data delivery for emergency communication services.

8. The communication gateway of claim 1, wherein the front-end processor is communicatively coupled to the master gateway to coordinate session-initiation-protocol enablement among a plurality of front-end processors.

9. The communication gateway of claim 8, wherein the front-end processor is communicatively coupled to the master gateway via a short messaging system external short messaging entity.

10. The communication gateway of claim 1, wherein the short-message-system network element and the front-end processor share a common Internet Protocol address.

11. A system comprising:
    a plurality of front-end processors each communicatively coupled to a respective one of a plurality of short-message system network elements, each of the plurality of front-end processors providing session-initiation-protocol services for translating short-message data transmitted between a plurality of session-initiation-protocol endpoints, each of the plurality of front-end processors storing a firewall table;

a master front-end processor communicatively coupled to each of the plurality of front-end processors and storing a plurality of external short-message entity profiles;

wherein each of the plurality of front-end processors manages its respective firewall table using the plurality of external short-message entity profiles.

12. The system of claim 11, wherein each of the plurality of front-end processors manages its respective firewall table to coordinate a response of each of the plurality of front-end processors to a security threat.

13. The system of claim 12, wherein the each of the plurality of front-end processors executes a respective layer 2 firewall using the firewall table, the respective layer 2 firewall screening messages received from the plurality of session-initiation-protocol endpoints.

14. The system of claim 13, wherein the security threat is detected by one of the plurality of front-end processors.

15. The system of claim 14, wherein data pertaining to the security threat is shared with the plurality of front-end processors communicatively coupled to a master gateway.

16. A communication gateway comprising:

a front-end processor providing session-initiation-protocol services for translating short-message data transmitted between a plurality of session-initiation-protocol endpoints, the front-end processor storing a firewall table, wherein the front-end processor is in communication with a master gateway storing a plurality of external short-message entity profiles, the front-end processor managing the firewall table using the plurality of external short-message entity profiles.

17. The communication gateway of claim 16, wherein the front-end processor manages the firewall table to coordinate a response of the front-end processor to a security threat.

18. The communication gateway of claim 17, wherein the front-end processor executes a layer 2 firewall using the firewall table, the layer 2 firewall screening messages received from the plurality of session-initiation-protocol endpoints.

19. The communication gateway of claim 18, wherein the security threat is detected by the front-end processor.

20. The communication gateway of claim 19, wherein data pertaining to the security threat is shared with other front-end processors communicatively coupled to the master gateway.

* * * * *